(12) United States Patent
Hantehzadeh

(10) Patent No.: US 11,514,530 B2
(45) Date of Patent: Nov. 29, 2022

(54) IMAGE PROCESSING SYSTEM USING CONVOLUTIONAL NEURAL NETWORKS

(71) Applicant: CCC Information Services Inc., Chicago, IL (US)

(72) Inventor: Neda Hantehzadeh, Chicago, IL (US)

(73) Assignee: CCC Information Services Inc., Chicago, IL (US)

( * ) Notice: Subject to any disclaimer, the term of this patent is extended or adjusted under 35 U.S.C. 154(b) by 206 days.

(21) Appl. No.: 16/874,167

(22) Filed: May 14, 2020

(65) Prior Publication Data

US 2021/0358048 A1 Nov. 18, 2021

(51) Int. Cl.
| | |
|---|---|
| *G06Q 40/08* | (2012.01) |
| *G06N 3/04* | (2006.01) |
| *G06K 9/62* | (2022.01) |
| *G06N 3/08* | (2006.01) |
| *G06V 10/40* | (2022.01) |
| *G06V 20/00* | (2022.01) |

(52) U.S. Cl.
CPC ........... *G06Q 40/08* (2013.01); *G06K 9/6217* (2013.01); *G06N 3/0445* (2013.01); *G06N 3/0454* (2013.01); *G06N 3/08* (2013.01); *G06V 10/40* (2022.01); *G06V 20/00* (2022.01)

(58) Field of Classification Search
CPC .................................................... G06Q 40/08
See application file for complete search history.

(56) References Cited

U.S. PATENT DOCUMENTS

| 10,319,094 B1 | 6/2019 | Chen | |
|---|---|---|---|
| 10,740,891 B1* | 8/2020 | Chen | G06T 7/0008 |
| 2009/0087040 A1* | 4/2009 | Torii | G06K 9/6221 382/118 |
| 2010/0002920 A1* | 1/2010 | Cosatto | G06V 20/698 382/128 |
| 2014/0316825 A1 | 10/2014 | Van Dijk | |
| 2016/0259994 A1 | 9/2016 | Ravindran | |
| 2017/0293894 A1 | 10/2017 | Taliwal | |
| 2018/0260793 A1* | 9/2018 | Li | G06N 3/084 |
| 2019/0205649 A1* | 7/2019 | Ananthanarayanan | G06K 9/6256 |
| 2020/0273001 A1* | 8/2020 | Taliwal | G06Q 10/20 |
| 2020/0349370 A1* | 11/2020 | Lambert | G06T 7/75 |

FOREIGN PATENT DOCUMENTS

EP 3065085 A1 * 9/2016 ............... G06K 9/00

OTHER PUBLICATIONS

International Search Report and Written Opinion for App. No. PCT/US2021/032416, dated Aug. 6, 2021, 22 pages.
Ullah et al., "Action recognition in videl sequences using deep bi-directional LSTM with CNN features", IEEE, vol. 6, 2018, 12 pages.

* cited by examiner

*Primary Examiner* — Scott C Anderson
(74) *Attorney, Agent, or Firm* — Loeb & Loeb LLP

(57) ABSTRACT

A method and system is described which attempts to address the technical problems involved in analyzing images using advanced computer systems and making decisions about the future of a damaged automobile based on the images.

20 Claims, 20 Drawing Sheets

IMAGE PROCESSING SYSTEM USING CONVOLUTIONAL NEURAL NETWORKS

BACKGROUND

The background description provided herein is for the purpose of generally presenting the context of the disclosure. The work of the presently named inventors, to the extent it is described in this background section, as well as aspects of the description that may not otherwise qualify as prior art at the time of filing, are neither expressly nor impliedly admitted as prior art against the present disclosure.

At a high level, insurance companies have customers that are the subject of vehicle damage. The insurance company has numerous decisions to make including whether to try to fix the vehicle (or boat or motorcycle or other mobile device) or declare the vehicle "totaled" or a total loss and sell the vehicle for parts, if possible. In the past, a representative of the insurance company would have to physically view the wrecked vehicle and make an estimate of the cost to fix the vehicle and compare it to the value of the vehicle if it was declared a total loss.

As mobile phones such as smart phones have become more common and the images provided by mobile phones are improved, some insurance companies have tried to make the repair or total decision based solely on images provided by the customers. However, the images are limited in their visual fidelity and the decision on whether to repair or total the vehicle can be challenging when the images miss key details or the details are blurry.

SUMMARY

The following presents a simplified summary of the present disclosure in order to provide a basic understanding of some aspects of the disclosure. This summary is not an extensive overview of the disclosure. It is not intended to identify key or critical elements of the disclosure or to delineate the scope of the disclosure. The following summary merely presents some concepts of the disclosure in a simplified form as a prelude to the more detailed description provided below.

The described system and method may take a plurality of photos, and using a variety of algorithmic approaches, may select the best photos and identify key features to create an analysis with improved results in a total loss or repair decision.

In addition, other factors may indicate the severity of damage to the vehicle. For example, telematics data, drivability status data, point of impact data, accident report data, or video data corresponding to the damaged vehicle may also be used to assist in determining whether a vehicle should be repaired or totaled.

A method and system is described which attempts to address the technical problems involved in analyzing images using advanced computer systems and making decisions about the future of a damaged automobile based on the images.

BRIEF DESCRIPTION OF THE FIGURES

The invention may be better understood by references to the detailed description when considered in connection with the accompanying drawings. The components in the figures are not necessarily to scale, emphasis instead being placed upon illustrating the principles of the invention. In the figures, like reference numerals designate corresponding parts throughout the different views.

Figure 1:
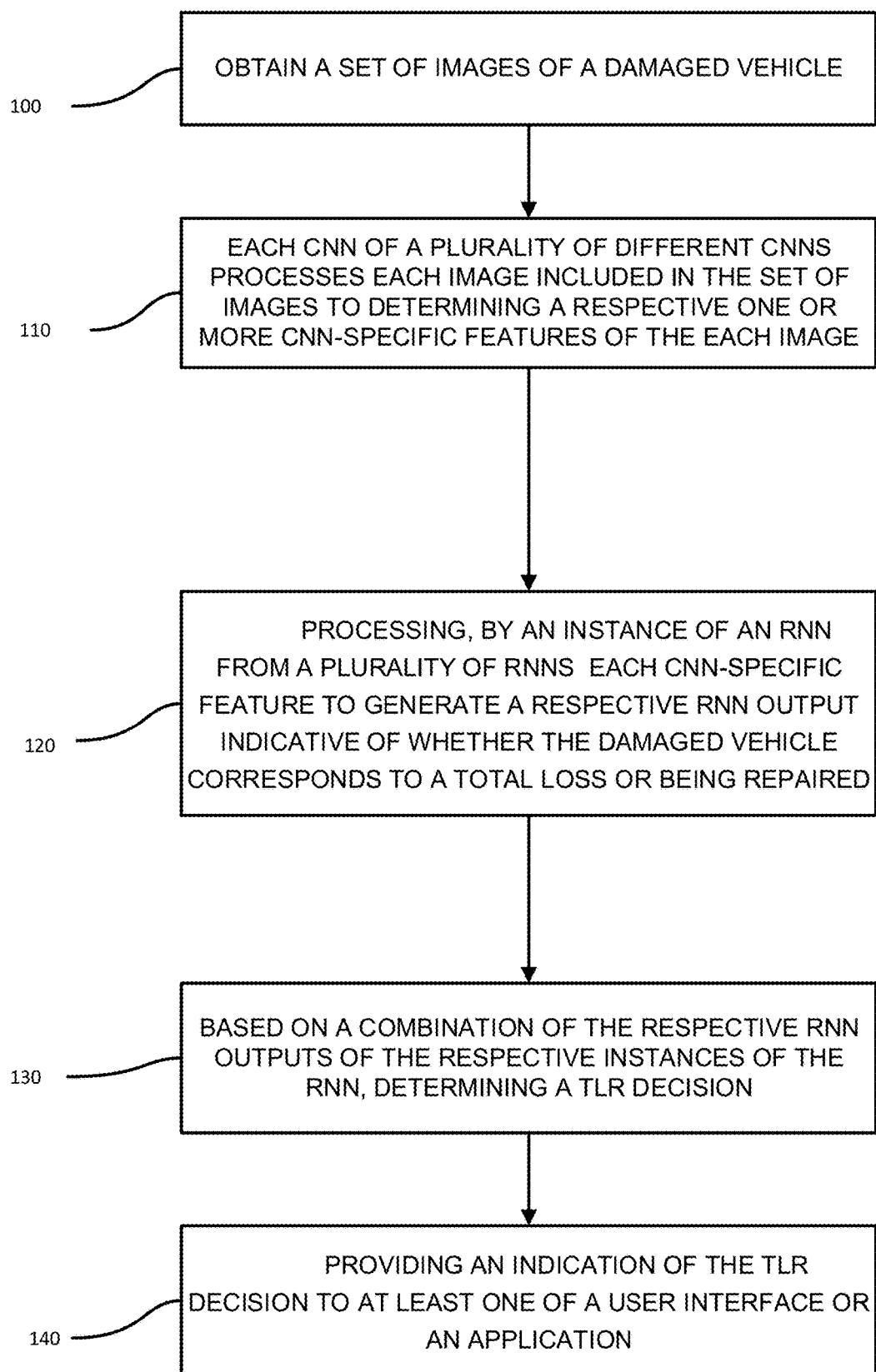
FIG. 1 may be an illustration of computing blocks performed by the system and method.

Persons of ordinary skill in the art will appreciate that elements in the figures are illustrated for simplicity and clarity so not all connections and options have been shown to avoid obscuring the inventive aspects. For example, common but well-understood elements that are useful or necessary in a commercially feasible embodiment are not often depicted in order to facilitate a less obstructed view of these various embodiments of the present disclosure. It will be further appreciated that certain actions and/or steps may be described or depicted in a particular order of occurrence while those skilled in the art will understand that such specificity with respect to sequence is not actually required. It will also be understood that the terms and expressions used herein are to be defined with respect to their corresponding respective areas of inquiry and study except where specific meaning have otherwise been set forth herein.

SPECIFICATION

The present invention now will be described more fully hereinafter with reference to the accompanying drawings, which form a part hereof, and which show, by way of illustration, specific exemplary embodiments by which the invention may be practiced. These illustrations and exemplary embodiments are presented with the understanding that the present disclosure is an exemplification of the principles of one or more inventions and is not intended to limit any one of the inventions to the embodiments illustrated. The invention may be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

At a high level, insurance companies have customers that are the subject of vehicle damage from accidents and the like. The insurance company may have numerous decisions to make including whether to try to fix the vehicle (or boat or motorcycle or other mobile device) or declare the vehicle "totaled" or a total loss and sell the vehicle for parts, if possible. In the past, a representative of the insurance company would have to physically view the wrecked vehicle and make an estimate of the cost to fix the vehicle and compare it to the value of the vehicle if it was declared a total loss.

As mobile phones such as smart phones have become more common and the images provided by mobile phones are improved, some insurance companies have tried to use images to assist in making the repair or total decision. However, the images are limited in their visual fidelity and the decision on whether to repair or total the vehicle can be challenging when the images miss key details or the details are blurry. The described system and method may take a plurality of photos, and using a variety of algorithmic approaches may select the best photos and try to create a decision with improved results.

In addition, other factors may indicate the severity of damage to the vehicle. For example, telematics data, drivability status data, point of impact data, accident report data, or video data corresponding to the damaged vehicle may also be used to assist in determining whether a vehicle should be repaired or totaled.

A method and system is described which attempts to address the technical problems involved in analyzing images and making decisions about the future of a damaged vehicle based on the images. Referring to FIG. 1, at block 100, a set of images of a damaged vehicle may be obtained. The images may be obtained in a variety of ways. In some embodiments, the images are provided by a consumer such as a consumer using a portable computing device like a smart phone to take pictures and submit the picture via email, via text message via sms message, by submitting the images to a user interface or by communicating a link to the images stored in a remote location. Of course, other ways of communicating the images are possible and are contemplated.

In addition, additional data may be communicated. Vehicles may have a variety of sensors and the data from those sensors may be communicated. Common sensors include sensors that provide telematics data like corning forces, acceleration, velocity, deceleration, mileage, etc. Other sensors may include engine sensors which report on the various aspects of the engine including if it is now drive-able and if some parts are clearly not responding or are sending signals that the part is broken. In some instances, the sensors may simply indicate the vehicle is inoperable for a variety of reasons. In some embodiments, the sensors may also determine a point of impact data. Some vehicle also may have an emergency reporting system for accidents and the emergency reporting data may also be useful.

In some embodiments, outside sources may provide accident data. For example, law enforcement may make measurement of an accident scene such as a length of skid marks, the conditions of a road, the amount of daylight, etc. Further, some environments may have permanent speed detection sensors or video sensors which may provide useful data. Automated toll collection devices may also be used the track a vehicle at various points of time which may be useful in providing vehicle telematics data.

In some additional environments, vehicles may be tracked using a variety of technologies such as GPS, cellular or wifi technology along with video surveillance. The GPS data may be used to determine a variety of vehicle telematics by tacking the vehicle location at a plurality of points in time. WiFi may have contact with a vehicle when the vehicle is in range of a wifi antenna and by noting the time the vehicle is in range or various WiFi antennas and the strength of the signal, a variety of telematics may be determined. Similarly, cellular towers may have antennas and the signal of a vehicle (or a person with a portable computing device in the vehicle) may be tracked by noting the time a signal is received by a first antenna and by an additional antenna along with the strength of the signal at the various antennas as the vehicle passed.

Some vehicles also may have video data corresponding to the damaged vehicle and the accident itself. For example, some vehicles may have dash cams which may have captured the moment of impact. In other embodiments, cameras used to assist in parking may have also captured images of the impact. As can be seen, vehicles have a variety of sensors and the data from the variety of sensors may be useful in determining the extent of damage to a vehicle.

All the images and sensor data may present a variety of points of view of a vehicle before and after an impact. Trying to make logical sense from the data to make an informed and logical decision whether to repair or total a vehicle may be a significant technical challenge. At an initial computing block, the system and method may include selecting the set of images of the damaged vehicle from a plurality of images of the damaged vehicle based on some factors. The factors may vary and may be adjusted based on the situation, by the receiver of the data and by past experience of the receiver. As one example, image quality may be used as a way to sift out the images. Images from a parking sensor on a vehicle may be blurry and of little use. Similarly, images from a parking sensor may not be useful in determining an extent of damage to the interior of the vehicle as the sensors are on the outside of the vehicle and the content of the images may not display the damage in question or may not be useful in determining whether the vehicle should be repaired of totaled. The total number of images may also be overwhelming and duplicative and duplicate images may be determined to be of limited value. In some embodiments, only one image may be of use and it may be determined that only one image may be evaluated. In other embodiments, a plurality of images may be evaluated.

Figure 2:
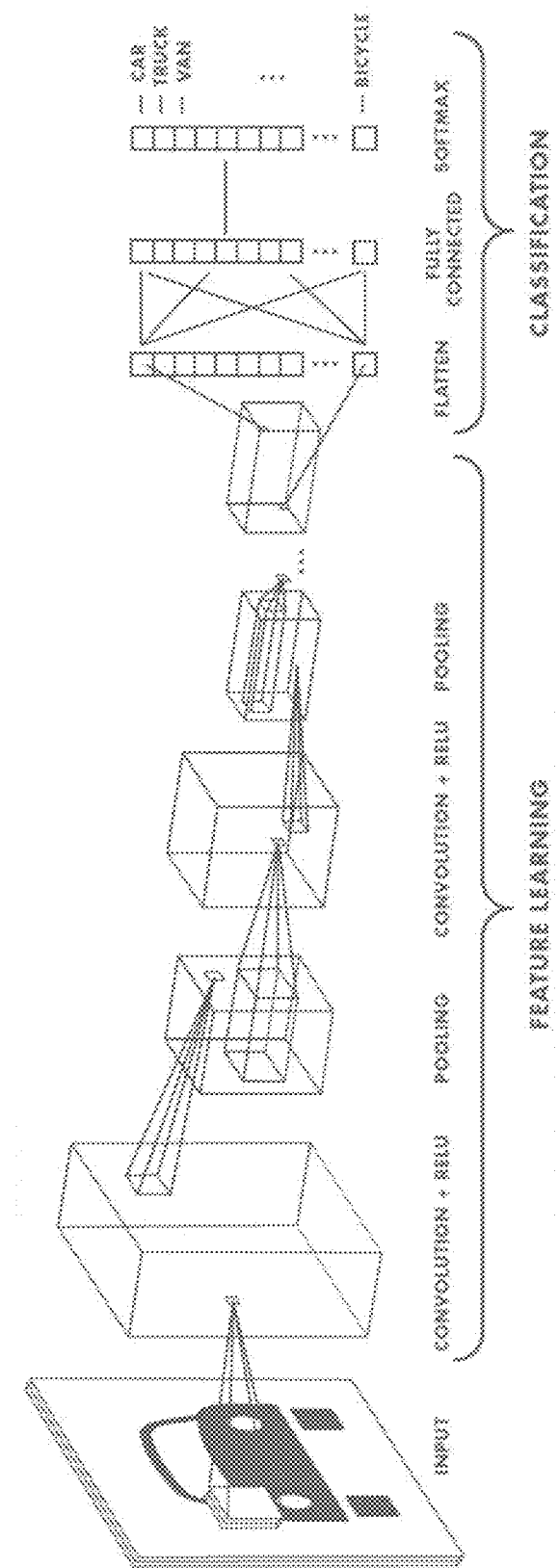
FIG. 2 may illustrate a Convolutional Neural Network (CNN) operation at a high level.

At block 110, the system and method may process, by each Convolutional Neural Network (CNN) from a plurality of different CNNs, each image that may be included in the set of images. Each CNN may determining a respective one or more CNN-specific features of the each image. At a high level as illustrated in FIG. 2, a CNN may be a deep learning algorithm which may take in an input image, assign importance (learnable weights and biases) to various aspects/objects in the image and be able to differentiate one from the other. The pre-processing required in a CNN may be lower as compared to other classification algorithms. While in primitive methods, filters are hand-engineered, with enough training, CNNs may have the ability to learn these filters/characteristics.

The architecture of a CNN may be analogous to that of the connectivity pattern of neurons in the human brain as the CNN was inspired by the organization of the visual cortex of the human brain. Individual neurons may respond to stimuli only in a restricted region of the visual field known as the receptive field. A collection of such fields may overlap to cover the entire visual area. CNN may act in a similar manner.

Figure 3:
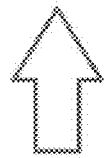
FIG. 3 may illustrate flattening a matrix.

An image may be thought of as a matrix of pixel values. It may be possible to flatten the image (e.g. 3×3 image matrix into a 9×1 vector as illustrated in FIG. 3) and feed it to a multi-level perceptron for classification purposes. In cases of extremely basic binary images, the method might show an average precision score while performing prediction of classes but would have little to no accuracy when it comes to complex images having pixel dependencies throughout. A CNN may be able to successfully capture the spatial and temporal dependencies in an image through the application of relevant filters. The architecture may perform a better fitting to the image dataset due to the reduction in the number of parameters involved and reusability of weights. In other words, the network may be trained to understand the sophistication of the image better.

Figure 4:
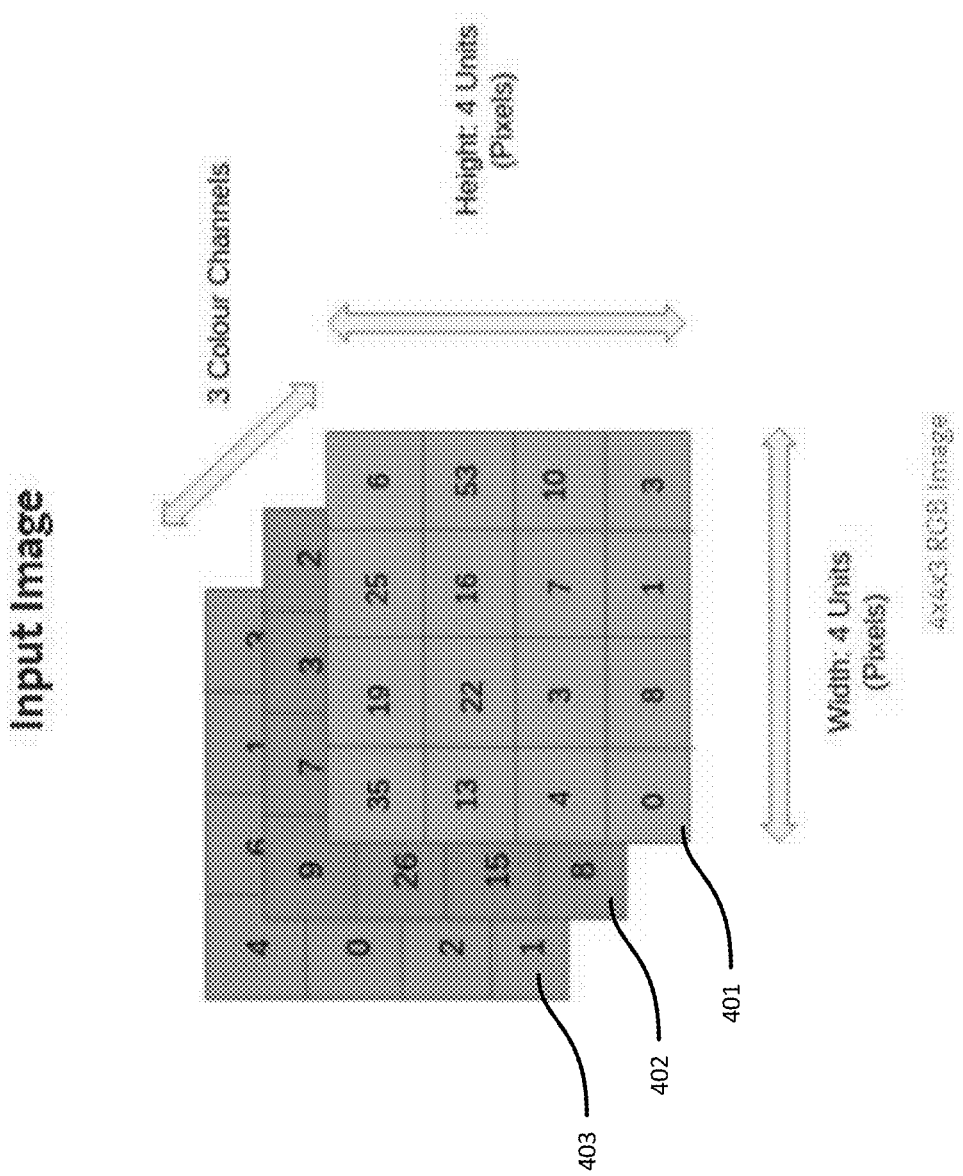
FIG. 4 may illustrate a matrix representing red colors in an image, a matrix representing green colors in an image and a matrix representing blue colors in an image.

In FIG. 4, an RGB image may be illustrated as being separated by its three color planes—red 401, green 402, and blue 403. There may be a number of such color spaces in which images exist—grayscale, RGB, HSV, CMYK, etc. The image may become computationally intensive once the images reach higher dimensions, say 8K (7680×4320). The role of the CNN may be to reduce the images into a form which is easier to process, without losing features which are critical for getting a good prediction. The reduction may be important when designing an architecture which is not only good at learning features but also is scalable to massive datasets.

Convolution Layer—The Kernel

Figure 5:
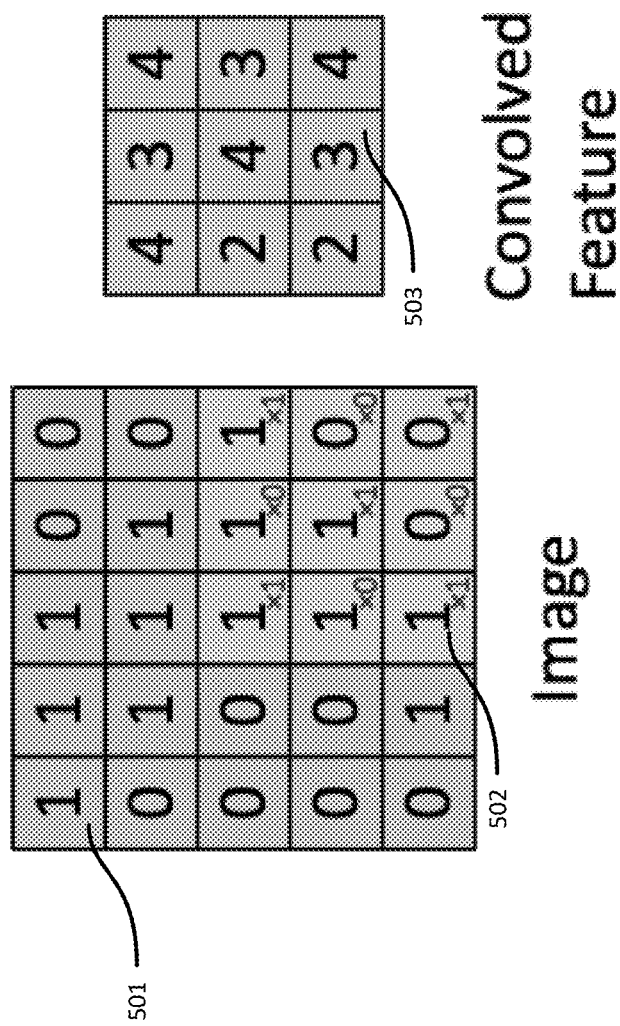
FIG. 5 illustrates taking a matrix which represents an image and determining the convolved feature of the image.

In the illustration in FIG. 5, the green section 501 may resemble the 5×5×1 input image, I. The element involved in carrying out the convolution operation in the first part of a convolutional layer may be called the kernel/filter, K, represented in the color yellow 502. As an example and not a limitation, K may be selected as a 3×3×1 matrix 503.

| Kernel/Filter, K= | | |
|---|---|---|
| 1 | 0 | 1 |
| 0 | 1 | 0 |
| 1 | 0 | 1 |

The kernel may shift 9 times because of a stride length=1 (Non-Strided), every time performing a matrix multiplication operation between K and the portion P of the image over which the kernel is hovering.

Figure 6:
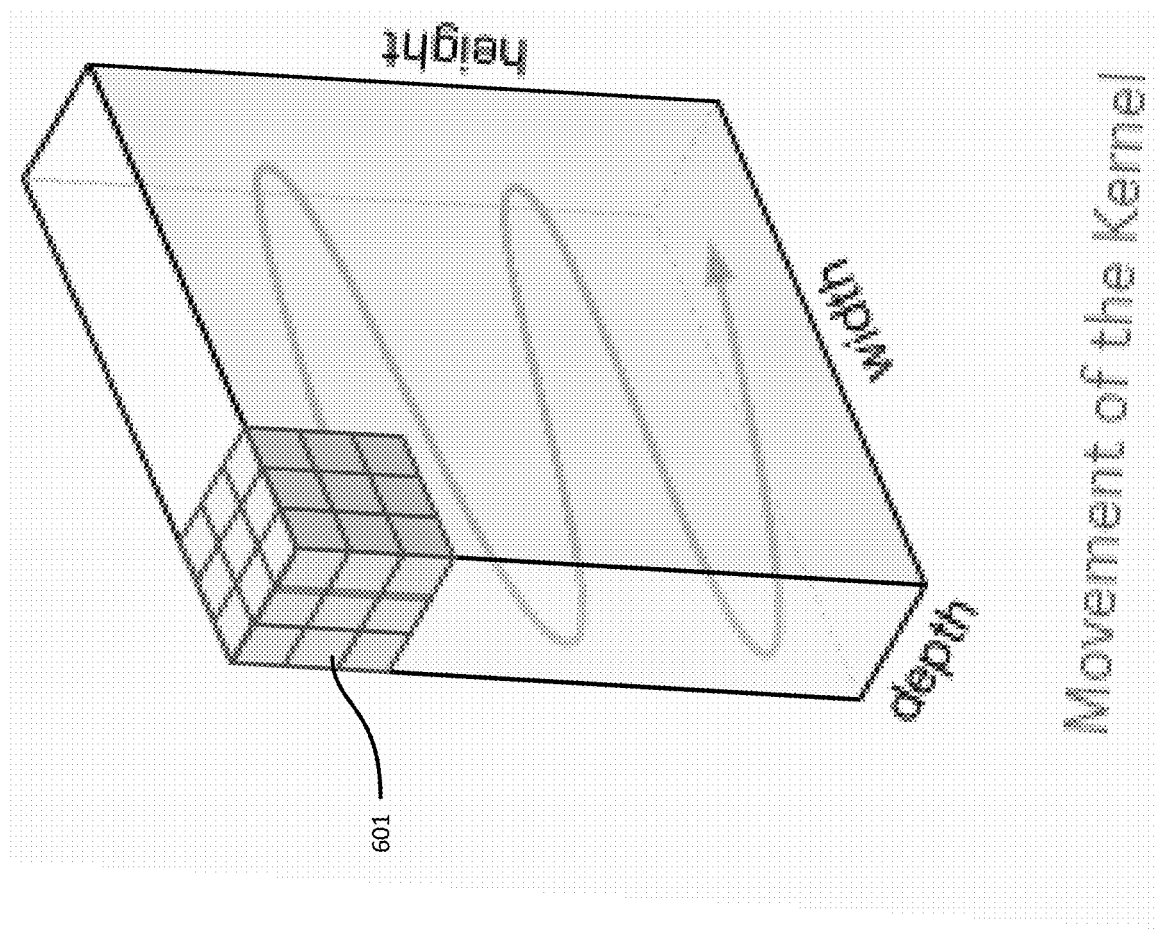
FIG. 6 illustrates that the filter may move with a certain stride value until it parses the complete width.

As illustrated in FIG. 6, the filter may move to the right with a certain stride value until it parses the complete width of the image 601. Moving on, it may hop down to the beginning (left) of the image 601 with the same stride value and it may repeat the process until the entire image 601 is traversed.

Figure 7:
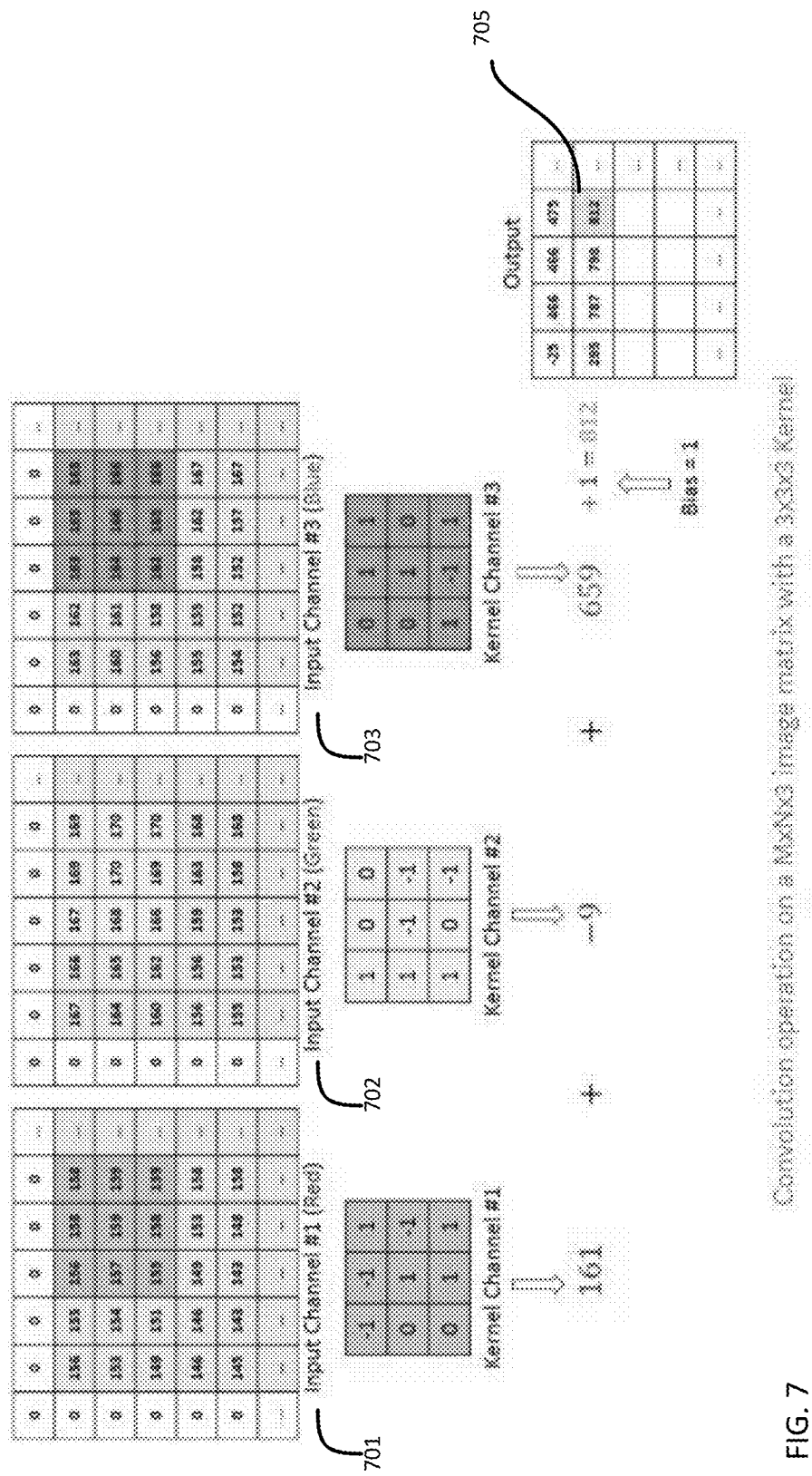
FIG. 7 illustrates the case of images with multiple channels (e.g. RGB), the kernel may have the same depth as that of the input image.

As illustrated in FIG. 7, in the case of images with multiple channels (e.g. Red 701 Green 702 Blue 703), the kernel may have the same depth as that of the input image. Matrix multiplication may be performed between Kn and In stack ([K1, I1]; [K2, I2]; [K3, I3]) and all the results may be summed with the bias to give a squashed one-depth channel Convoluted Feature Output 705.

Figure 8:
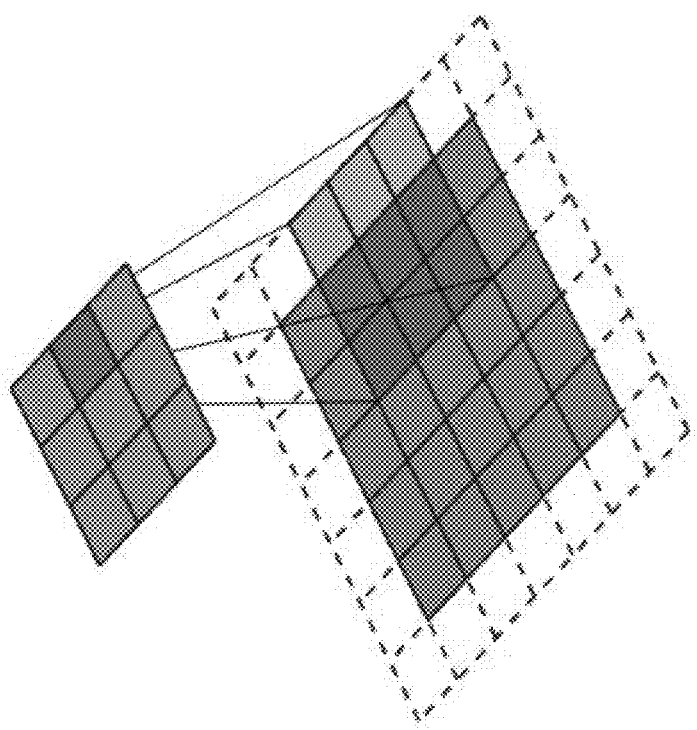
FIG. 8 illustrates that the convolution operation may extract the high-level features such as edges, from the input image.

As illustrated in FIG. 8, the objective of the convolution operation may be to extract the high-level features such as edges, from the input image. CNNs need not be limited to only one convolutional layer. Conventionally, the first CNN layer may be responsible for capturing the low-level features such as edges, color, gradient orientation, etc. With added layers, the architecture may adapt to the high-level features as well, giving us a network which has the wholesome understanding of images in the dataset.

There may be two types of results to the operation—one result may be that the convolved feature is reduced in dimensionality as compared to the input, and the other result may be that the dimensionality is either increased or remains the same. The change may be made by applying valid padding in case of the former, or same padding in the case of the latter.

Figure 9:
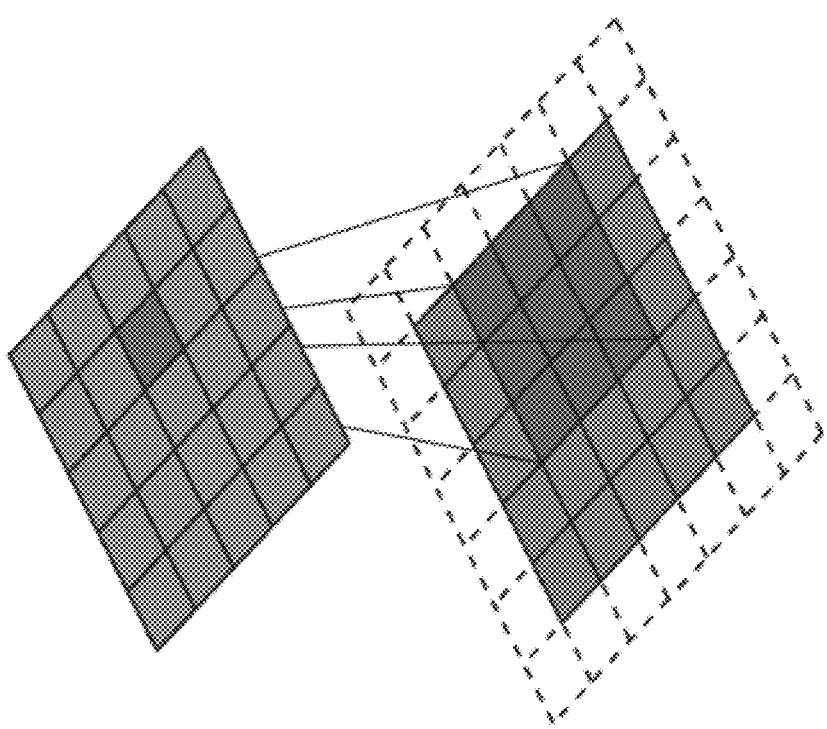
FIG. 9 illustrates when the 5×5×1 image is augmented into a 6×6×1 image and then the 3×3×1 kernel is applied over it, the convolved matrix may turn out to be of dimensions 5×5×1.

As illustrated in FIG. 9, when the 5×5×1 image is augmented into a 6×6×1 image and then the 3×3×1 kernel is applied over it, the convolved matrix may turn out to be of dimensions 5×5×1. Hence the name—same padding.

On the other hand, if the same operation is performed without padding, the matrix may have the dimensions of the Kernel (3×3×1) itself—which may also be called valid padding.

Figure 10:
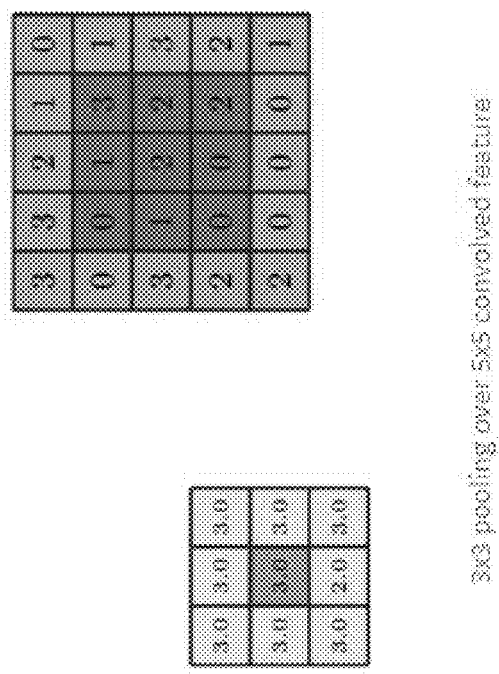
FIG. 10 illustrates that the pooling layer may be responsible for reducing the spatial size of the convolved feature.

Referring to FIG. 10, similar to the convolutional layer, the pooling layer may be responsible for reducing the spatial size of the convolved feature. This goal may be to decrease the computational power required to process the data through dimensionality reduction. Furthermore, it may be useful for extracting dominant features which may be rotational and positional invariant, thus maintaining the process of effectively training of the model. For example, a vehicle hood may be one of many dominant features.

Figure 11:
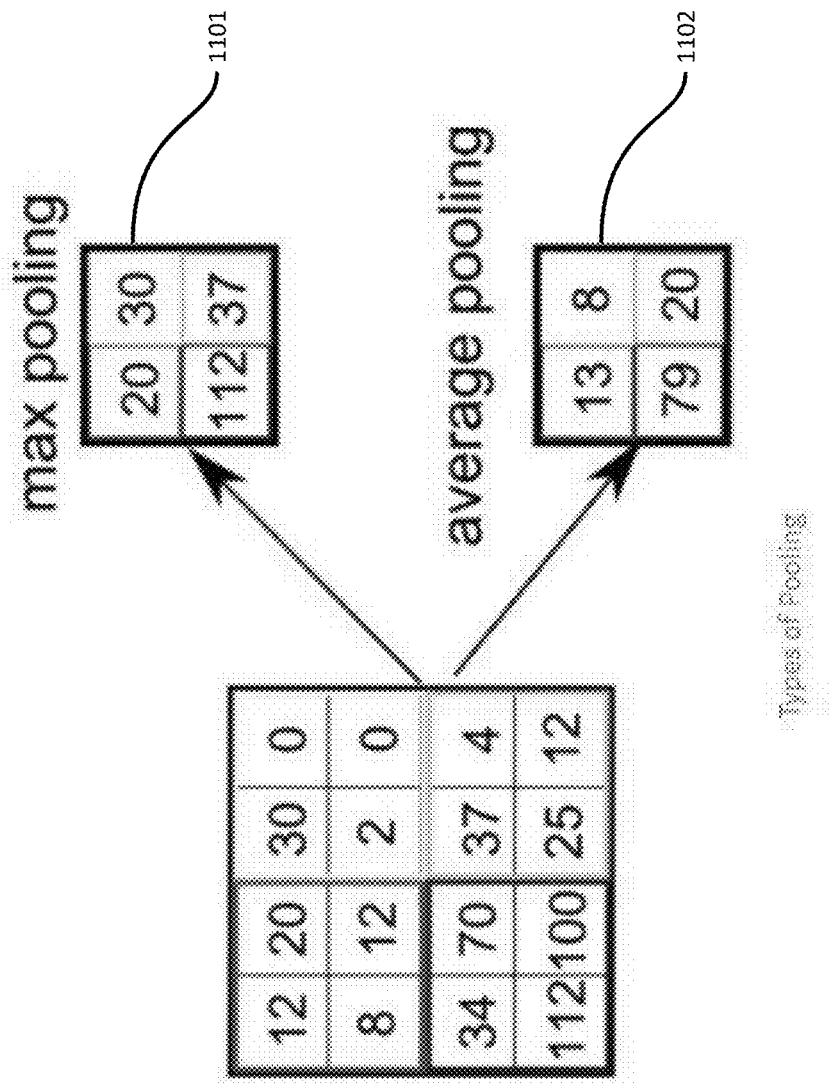
FIG. 11 illustrates that there may be two types of pooling: max pooling and average pooling.

As illustrated in FIG. 11, there may be two types of pooling: max pooling and average pooling. Max pooling 1101 may return the maximum value from the portion of the image covered by the kernel. On the other hand, average pooling 1102 may return the average of all the values from the portion of the image covered by the kernel.

Max pooling may also perform as a noise suppressant. It may discard the noisy activations altogether and also may perform de-noising along with dimensionality reduction. On the other hand, average pooling may simply perform dimensionality reduction as a noise suppressing mechanism. Hence, max pooling may perform a lot better than average pooling.

The convolutional layer and the pooling layer, together form the i-th layer of a CNN. Depending on the complexities in the images, the number of such layers may be increased for capturing low-levels details even further, but at the cost of more computational power.

After going through the above process, the model may be enabled to understand the features. Moving on, the system and method may flatten the final output and feed it to a regular neural network like a Recursive Neural Network (RNN) for classification purposes.

Figure 12:
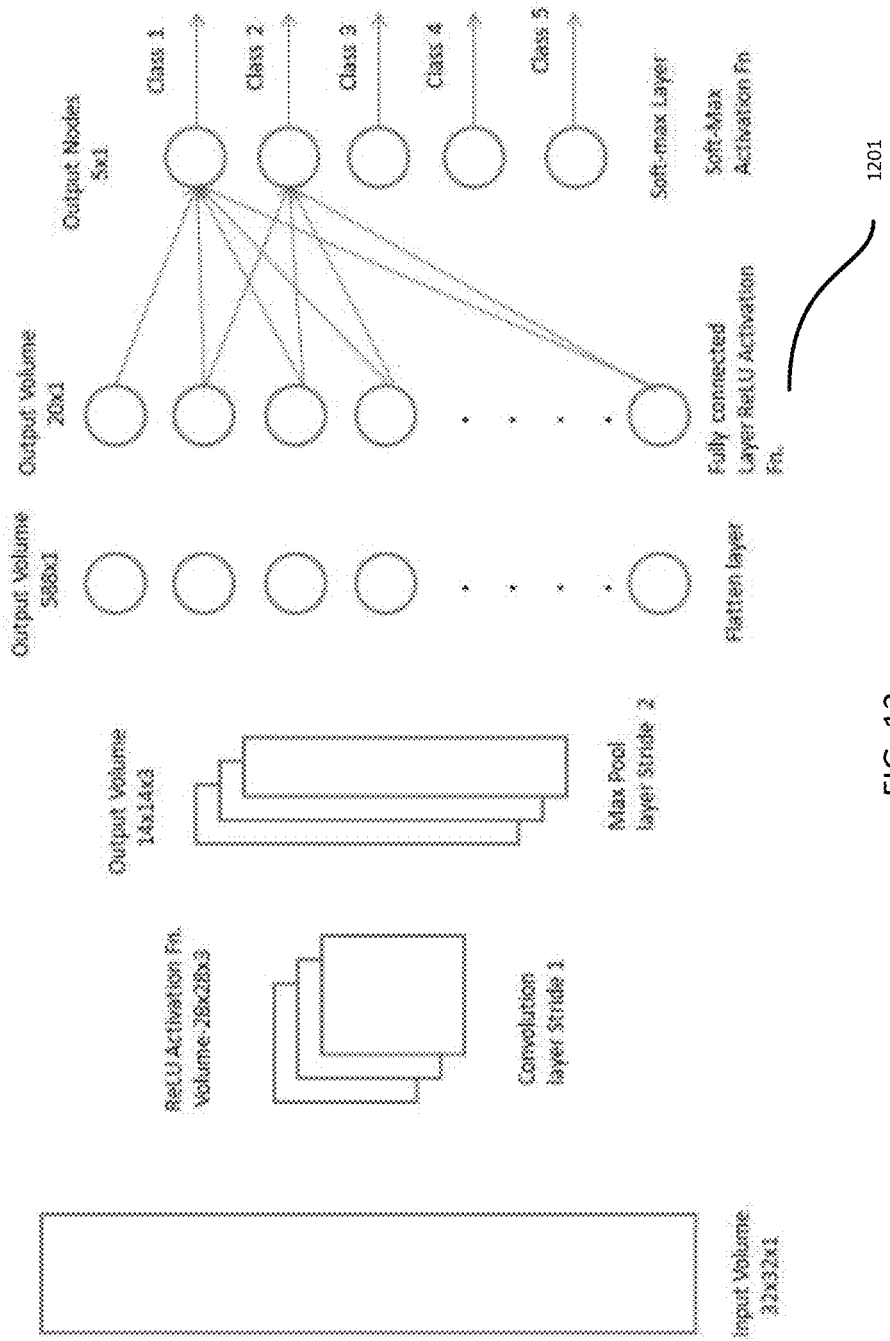
FIG. 12 illustrates that adding a fully-connected layer may be a way of learning non-linear combinations of the high-level features as represented by the output of the convolutional layer.

Referring to FIG. 12, adding a fully-connected layer 1201 may be a (usually) cheap way of learning non-linear combinations of the high-level features as represented by the output of the convolutional layer. The Fully-Connected layer 1201 may be learning a possibly non-linear function in that space.

Once the input image has been converted into a suitable form for a Multi-Level Perceptron, the image may be flattened into a column vector. The flattened output may be fed to a feed-forward neural network and backpropagation may be applied to every iteration of training. Over a series of epochs, the model may be able to distinguish between dominating and certain low-level features in images and classify them using the softmax classification technique.

There are various architectures of CNNs available which have been key in building algorithms which power and shall power AI as a whole in the foreseeable future. Some of them are listed below:
  LeNet
  AlexNet
  VGGNet
  GoogLeNet
  ResNet
  ZFNet Referring again to FIG. 1, each CNN of the plurality of different CNNs may be selected for inclusion in the plurality of different CNNs based on respective accuracies of a total loss or repair (TLR) decisions generated based on different combinations of different types of CNNs, the each CNN included in the different types of CNNs. In other words, a first CNN combination may be better than a second CNN combination at making TLR decisions and logically, the first CNN combination may be given a heavier weight.

In addition, each CNN of the plurality of different CNNs may be trained using historical vehicle total loss and repair data to detect a respective set of CNN-specific features. The historical vehicle total loss and repair data may include historical images, and the respective set of CNN-specific features including the respective one or more CNN-specific features. Using the large set of training data, even better decisions may be made. In addition, current decisions may be added to the database to result in an even bigger database to use. The importance of the data may sound trivial but may have an impact on TLR decisions. For example, if a body panel on a sports car is damaged and it is a rare piece made from carbon fiber, the cost to fix the damage may be higher than a vehicle where the body panel was made from a traditional material like steel or aluminum. Further, the year of the vehicle may be a factor as some years or some models may have rare parts while other years of models may have more common parts.

The system and method may also determine, by the each CNN, the respective one or more CNN-specific features of the each image includes extracting, via a respective set of layers of the each CNN, the respective one or more CNN-specific features of the each image. Again, a bent hood of a vehicle may indicate engine damage which may be a key factor in a TDL decision. Thus the hood may be a key feature located by the CNNM In some embodiments, the system and method may attempt to find certain images in the plurality of images. For example and not limitation, the system may attempt to locate eight view of the vehicle such as a front view, a rear view, a left view, a right view, a left front view, a left rear view, a right front view and a right rear view. With these view, using historical images, the make, model and year of a vehicle may be determined with great confidence. Other sample photos may include photos of a license plate, an interior, an invoice, an invalid zoom image, an odometer image, an other image a yin image and a ValidZoom image. The images may be sorted into the views and the best of the various views may be selected and used. If no damage was found in the selected photos, the photos may be used for vehicle classification but may be disgarded for TLR decisions or claim decisions. In other embodiments, a single phot may be used.

Referring again to FIG. 1, at block 120, the system and method may process, each CNN-specific feature included in the respective one or more CNN-specific features of the each image determined by the respective CNN. The process may be executed by a respective instance of an RNN (Recurrent Neural Network) that is included in a plurality of instances of the RNN and that is coupled to a respective CNN of the plurality of different CNNs. The RNNs may generate a respective RNN output indicative of whether the damaged vehicle corresponds to a total loss or the damaged vehicle corresponds to being repaired. In other embodiments, the CNNs may perform the analysis based on past data and related TLR decisions.

Recurrent Neural Networks (RNNs) may add an interesting twist to basic neural networks. A vanilla neural network may take in a fixed size vector as input which limits its usage in situations that involve a 'series' type input with no predetermined size.

Figure 13:
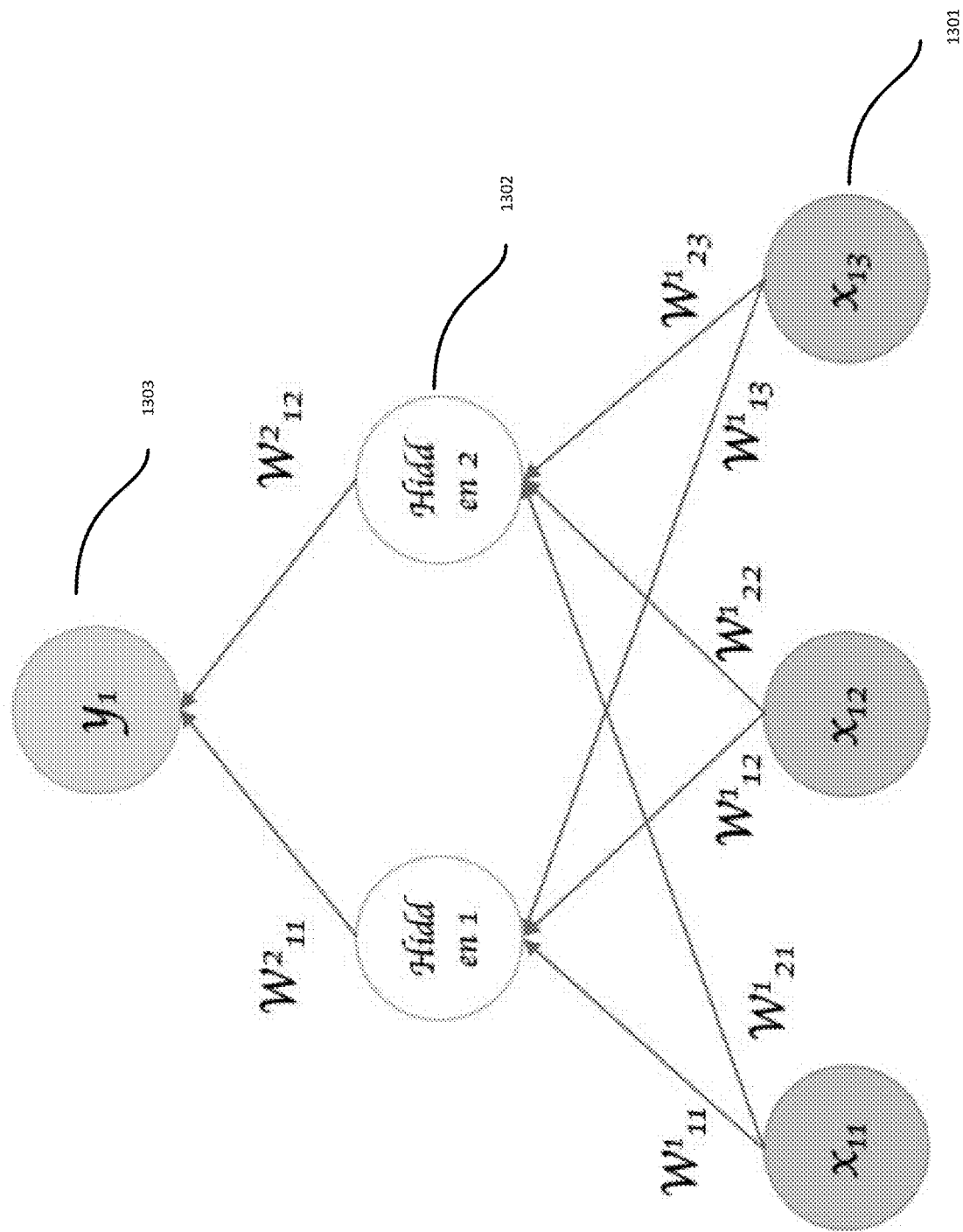
FIG. 13 illustrates a vanilla network representation may be illustrated, with an input of size 3 and one hidden layer and one output layer of size 1.
Figure 14:
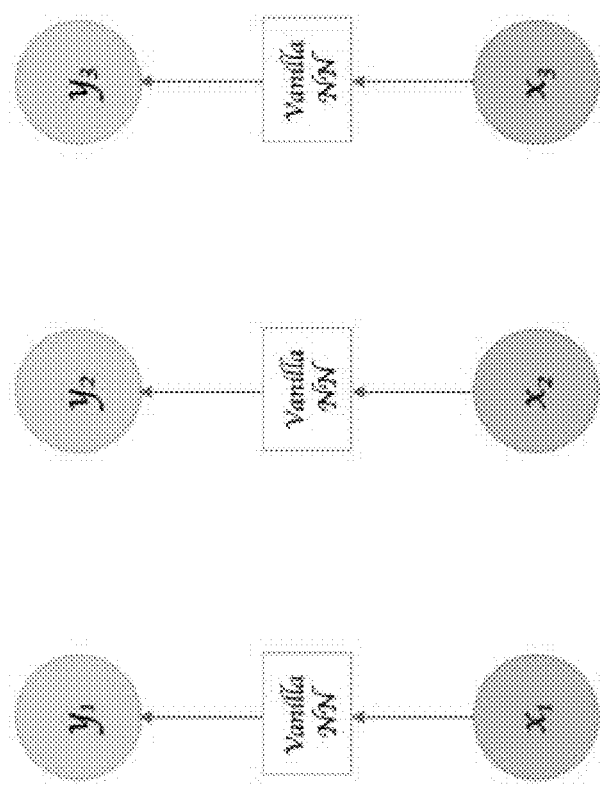
FIG. 14 illustrates a vanilla network that may be called repeatedly for a 'series' input.

Referring to FIG. 13, a vanilla network representation may be illustrated, with an input of size 3 1301 and one hidden layer 1302 and one output layer 1303 of size 1. RNNs may be designed to take a series of inputs with no predetermined limit on size. As illustrated in FIG. 14, vanilla network may be called repeatedly for a 'series' input. However, the 'series' part of the input may mean something. A single input item from the series may be related to other inputs and one input likely has an influence on its neighbor inputs. Otherwise it would just be "many" inputs, not a "series" input.

Recurrent Neural Networks

Recurrent Neural Networks may remember the past and RNN decisions may be influenced by what it has learned from the past. It should be noted that basic feed forward networks may "remember" things too, but those networks remember things they learned during training. For example, an image classifier may learn what a "1" looks like during training and then uses that knowledge to classify things in production.

Figure 15:
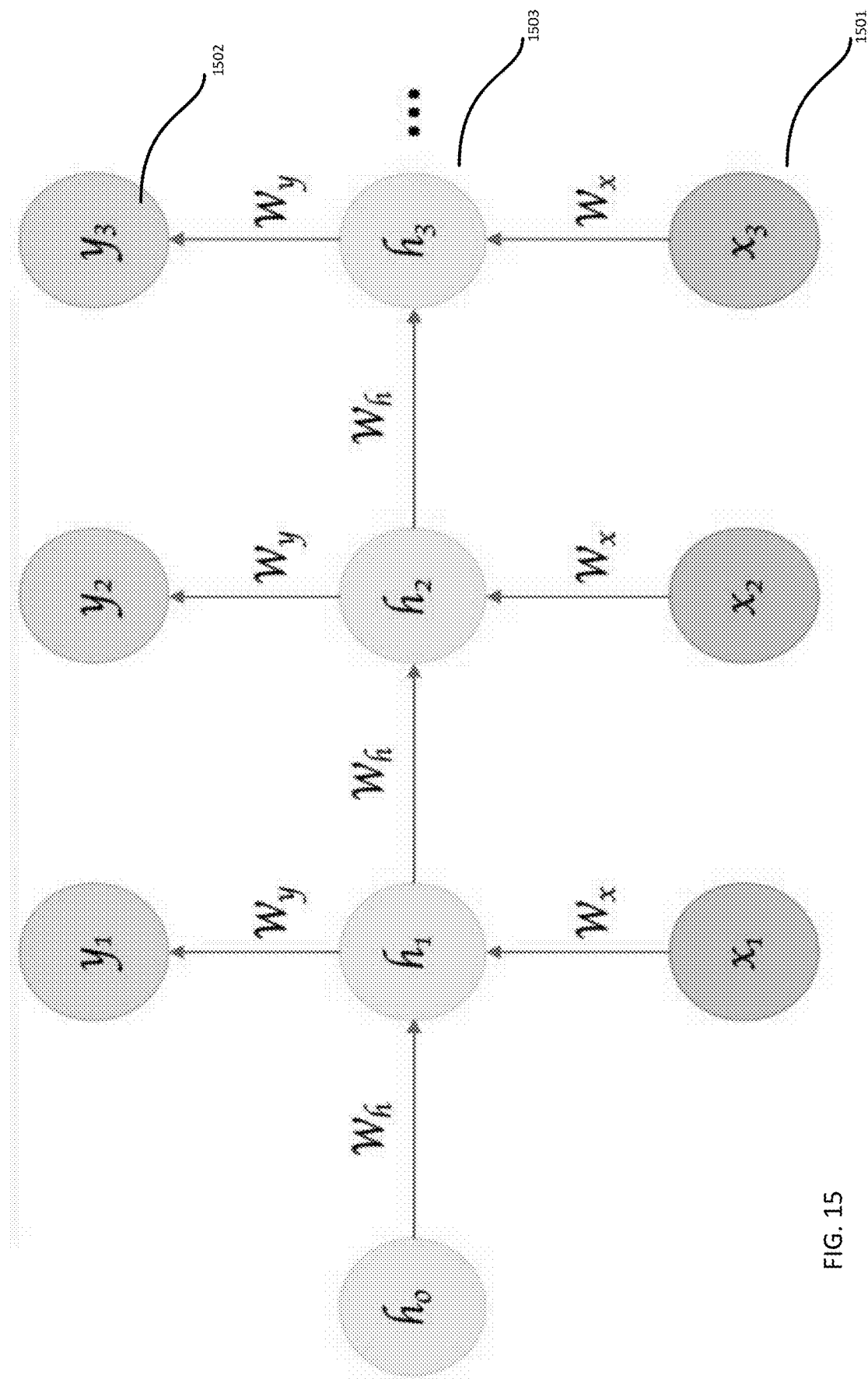
FIG. 15 illustrates a recurrent neural network, with a hidden state that is meant to carry pertinent information from one input item in the series to others.

While RNNs learn similarly while training, in addition, RNNs may remember things learned from prior input(s) while generating output(s). Referring to FIG. 15, history may be part of the network. RNNs may take one or more input vectors 1501 and produce one or more output vectors 1502 and the output(s) 1502 may be influenced not just by weights applied on inputs like a regular NN, but also by a "hidden" state vector representing the context based on prior input(s)/output(s). The same input may produce a different output depending on previous inputs in the series.

In summary, in a vanilla neural network, a fixed size input vector may be transformed into a fixed size output vector. Such a network may become "recurrent" the transformations are repeatedly applied to a series of given input and produce a series of output vectors. There may be no pre-set limitation to the size of the vector. And, in addition to generating the output which is a function of the input and hidden state, the hidden state itself may be updated based on the input and use it in processing the next input.

Parameter Sharing

There may be a key difference between FIG. 13 and FIG. 15. In FIG. 13, multiple different weights may be applied to the different parts of an input item generating a hidden layer neuron, which in turn is transformed using further weights to produce an output. There may be a significant number of weights in play. In contrast, in FIG. 15, the same weights may be applied over and over again to different items in the input series. FIG. 13 deals with "a" single input whereas the second figure represents multiple inputs from a series. Nevertheless, as the number of inputs increase, logical would dictate the number of weights in play should increase as well or else come depth and versatility may be lost.

Figure 16:
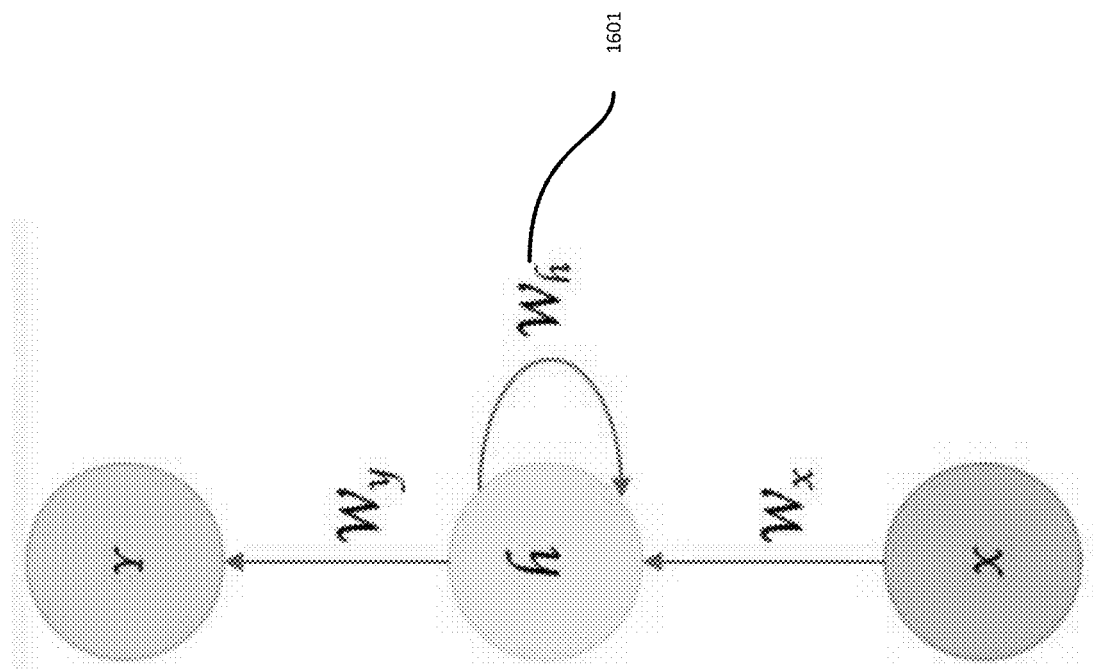
FIG. 16 may illustrate that what may be seemingly lost in value may be gained back by introducing the "hidden state" that links one input to the next.

The system and method may be sharing parameters across inputs in FIG. 16. If parameters across inputs are not shared, then it may become like a vanilla neural network where each input node requires weights of their own which introduces the constraint that the length of the input has to be fixed and the fixed length may makes it impossible to leverage a series type input where the lengths differ and is not always known.

Referring to FIG. 16, what may be seemingly lost in value may be gained back by introducing the "hidden state" 1601 that links one input to the next. The hidden state may capture the relationship that neighbors may have with each other in a serial input and it keeps changing in every step, and thus effectively every input undergoes a different transition!

Image classifying CNNs are effective because the 2D convolutions are an effective form of parameter sharing where each convolutional filter basically extracts the presence or absence of a feature in an image which may be a function of not just one pixel but also of its surrounding neighbor pixels. In other words, the success of CNNs and RNNs may be attributed to the concept of "parameter NNs" which may fundamentally be an effective way of leveraging the relationship between one input item and its surrounding neighbors in a more intrinsic fashion compared to a vanilla neural network.

The introduction of hidden state may allow the relationship between the inputs to be efficiently identified, may be a way to make a RNN "deep" and may gain the multi level abstractions and representations gained through "depth" in a typical neural network may be needed.

Figure 17:
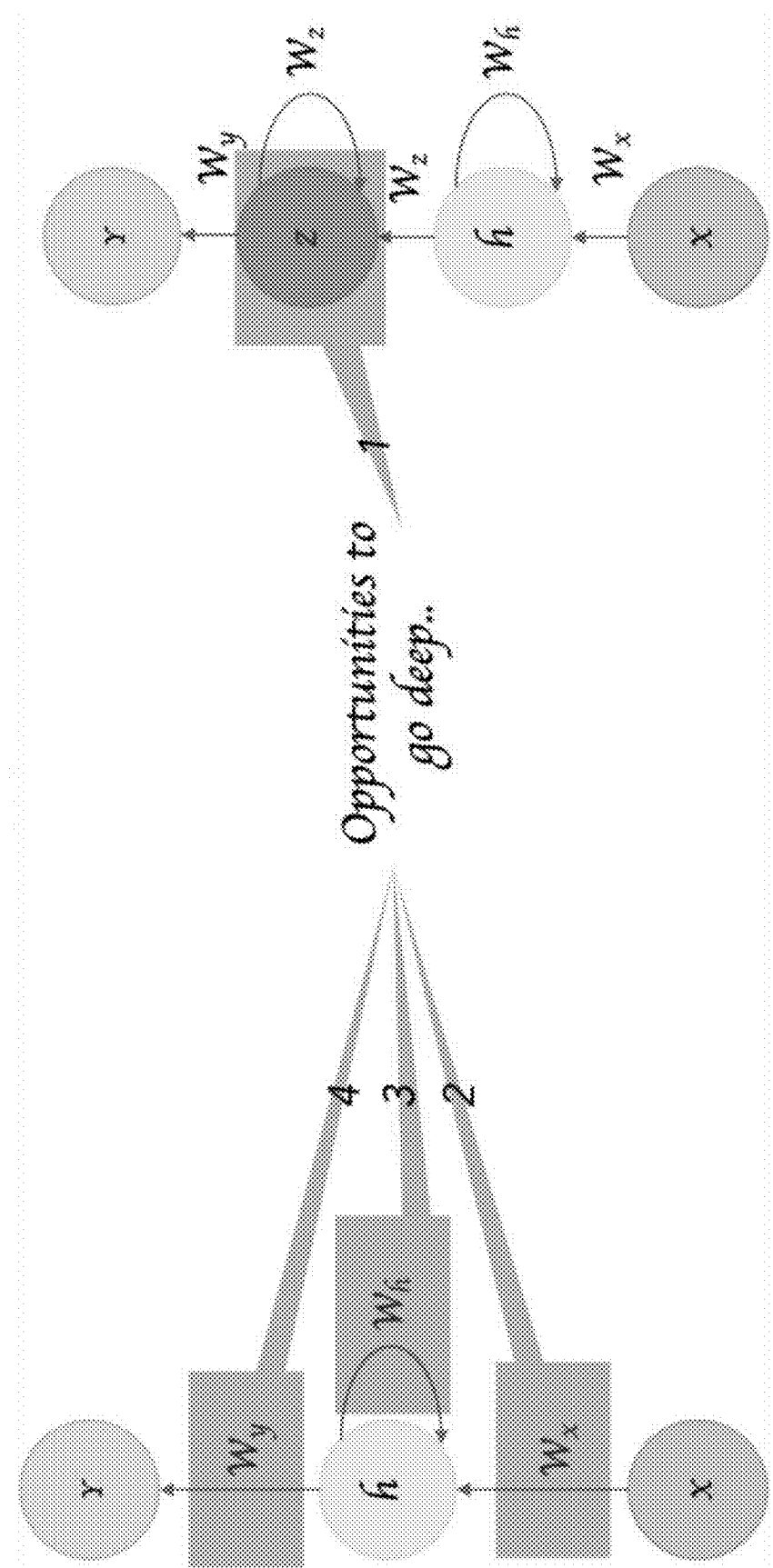
FIG. 17 illustrates that there may be many ways to increase depth.

Referring to FIG. 17, there may be many ways to increase depth. One way may be to add hidden states, one on top of another, feeding the output of one to the next. Another way may be to add additional nonlinear hidden layers between input to hidden state. Yet another way to increase depth may be to increase depth in the hidden to hidden transition Depth in the hidden to output transition also may be increased.

Recursive Neural Networks

A recurrent neural network parses the inputs in a sequential fashion. A recursive neural network may be similar to the extent that the transitions are repeatedly applied to inputs, but not necessarily in a sequential fashion. Recursive Neural Networks are a more general form of Recurrent Neural Networks. RNNs may operate on any hierarchical tree structure. Input nodes may be parsed, child nodes may be combined into parent nodes and those combined nodes may be combined with other child/parent nodes to create a tree like structure. Recurrent Neural Networks do the same, but the structure is strictly linear. i.e. weights are applied on the first input node, then the second, third and so on. Structure may be determined in many ways. If the structure is fixed like in Recurrent Neural Networks, then the process of training, backprop, etc. may makes sense in that the processes are similar to a regular neural network. It may also be learned.

In use, in some embodiments, as mentioned previously, other data corresponding to the damaged vehicle may be obtained. The respective instance of the RNN may process the each CNN-specific feature included in the respective one or more CNN-specific features of the each image determined by the respective CNN, to generating the respective RNN output. More specifically, the respective instance of the RNN may process the obtained other data in conjunction with the each CNN-specific feature included in the respective one or more CNN-specific features of the each image determined by the respective CNN, to generate the respective RNN output. The other types of data may include at least one of telematics data, drivability status data, point of impact data, accident report data, or video data corresponding to the damaged vehicle.

In some embodiments, the RNN may be trained using historical vehicle total loss and repair data. The historical vehicle total loss and repair data may be obtained from internal source or external sources or a combination thereof. The each CNN-specific feature of the each image may be processed by the respective instance of the RNN to generate the respective RNN output. The processing may include sequentially processing the each CNN-specific feature of the each image by the respective instance of the RNN to generate the respective RNN output.

As an example, previous photos of damage to vehicles may be submitted to the system and method. As part of the photos, the identified features and the total loss or damage data may also be included such that the system and method may learn from previous decisions.

Similarly, photos of vehicles from a variety of angles and interiors and exteriors may be submitted to the system and method along with make, year and model information about the vehicle in the photos. The system may select the set of images from a plurality of images of the damaged vehicle based on at least one of: image quality, image content, or a total number of images that are to be selected.

In this way, the make, year and model of a vehicle may be more accurately determined. It should be noted that both interior and exterior photos may be included as make, year and model information may be determined from both interior and exterior photos. Finally, in some situations, photos of a VIN or manufacture sticker may be included as part of the data. The VIN or manufacturer sticker may be researched to determine the make, year and model of the vehicle which may then be matched with any related photos.

Referring again to FIG. 1, at block 130 the system and method may determine, based on a combination of the respective RNN outputs of the respective instances of the RNN, one of: (i) the damaged vehicle is the total loss, or (ii) the damaged vehicle is to be repaired, the determination being a TLR decision. Determining the TLR decision based on the combination of the respective RNN outputs of the respective instances of the RNN may include determining the TLR decision based on a majority indicated by the combination of the respective RNN outputs of the respective instances of the RNN.

At block 140, an indication of the TLR decision may be provided to at least one of a user interface or an application. The system may also have an output interface via which an indication of the TLR decision is provided to at least one of a user interface or a computing application. In some embodiments, the decision may be communicated to an app that is operated by a supervisor such as an adjustor before it is communicated to a customer. In another embodiment, the decision may be communicated directly to a customer.

Figure 18:
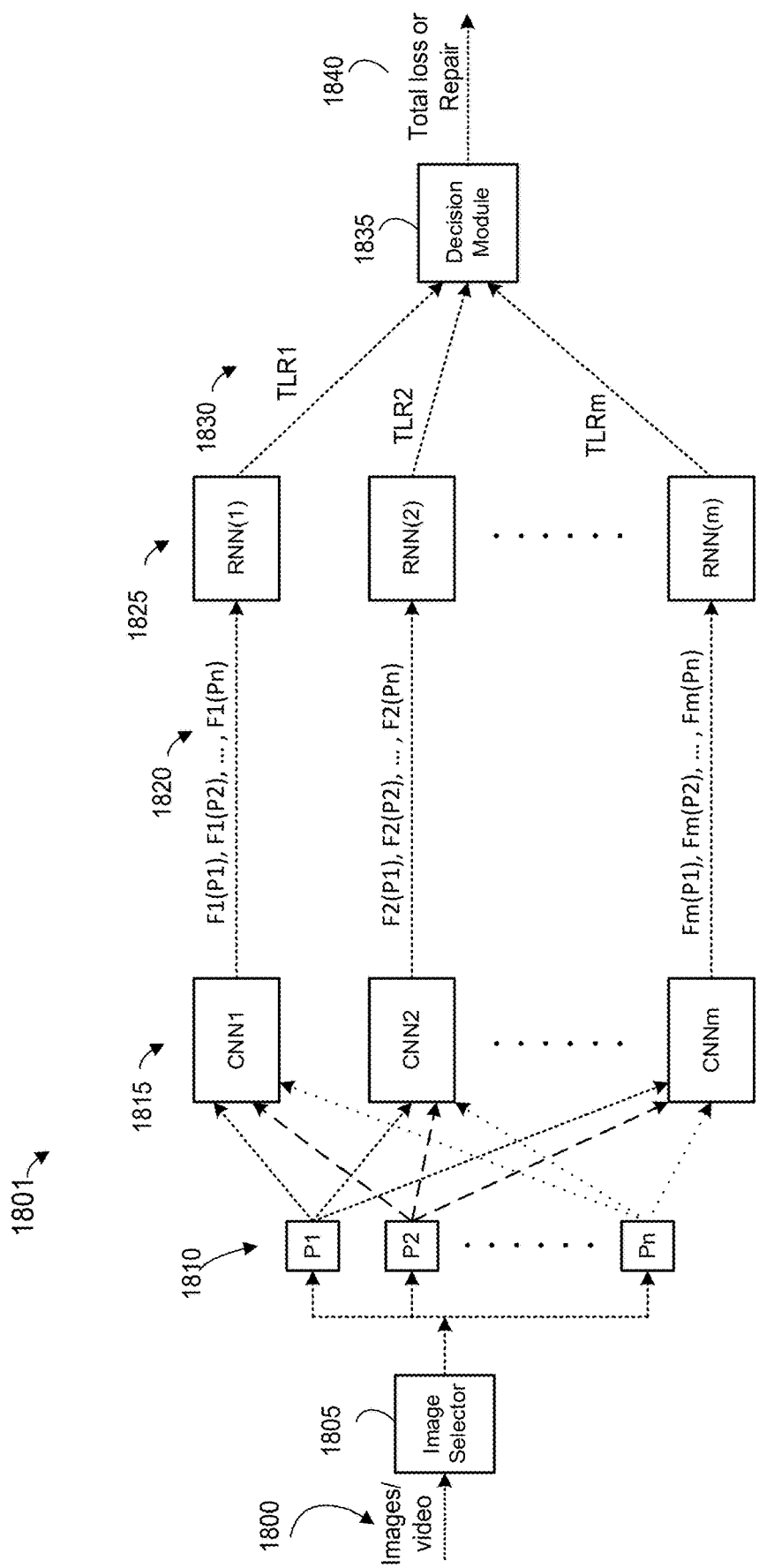
FIG. 18 may illustrate the flow of data through a system in accordance with the claims.

In another aspect, the system may have a variety of elements that make up the system. FIG. 18 may illustrate some elements of the system that may executed. An input output system may receive images 1800 of a damaged vehicle. In some embodiments, an image selection module 1805 may review the images 1800 and select the images 1810 be further processed. The set of images 1810 of the damaged vehicle may include images of a vehicle that is damaged from multiple points of impact.

The selected pictures may then to be communicated to various CNN 1815 where the photos 1810 may be analyzed. Feature 1 (1820) of photo 1 (1810) may be selected by CNN1, Feature 1 of photo 2 may be selected by CNN1, Feature n may be selected from photo n, etc and the features may be communicated to RNN1 for further .analysis about a total or repair decision. Similarly, .Feature 2 of photo 1 may be selected by CNN2, Feature 2 of photo 2 may be selected by CNN2, Feature n may be selected from photo n, etc and the features may be communicated to RNN1 for further .analysis about a total or repair decision. Likewise, Feature n from photo 1 may be selected by CNNn, Feature n from photo 2 may be selected by CNN2, Feature n may be selected from photo n, etc. and the features may be communicated to RNN1 for further .analysis about a total or repair decision. In other words, the number of features may not be limited and the number of photo may not be limited as indicated by the number n.

As illustrated, there may be a plurality of different CNNs 1815, each of which has a different architecture. The CNNs 1815 may be selected in a variety of ways. In one embodiment, each CNN 1815 of the plurality of different CNNs 1815 may be selected for inclusion in the plurality of different CNNs 1815 based on respective accuracies of TLR decisions generated based on different combinations of different types of CNNs in the past. In another embodiment, the combination of different CNNs 1815 may be selected from a plurality of different CNN 1815 combinations. The data from past accidents and determinations may be used to evaluate the CNNs 1815 or combination of CNNs 1815.

Each CNN 1815 may extract a respective one or more CNN-specific features 1820 from each image 1810 included in the set of images. The each CNN 1815 may be trained using historical vehicle total loss and repair data to determine a respective set of CNN specific features 1820 based on a variety of factors such as the different architecture of the each CNN 1815, the historical vehicle total loss and repair data including historical images, and the respective set of CNN specific features 1820 of the each CNN 1815 including the respective one or more CNN specific features 1820. The historical vehicle total loss and repair data may further include one or more other types of data including at least one of telematics data, drivability status data, point of impact data, accident report data, or video data and the like.

Based on the CNN specific features 1820 extracted from the set of images using the plurality of different CNNs, a TLR decision 1830 may be generated indicative of one of: (i) the damaged vehicle is a total loss, or (ii) the damaged vehicle is to be repaired.

The respective one or more CNN-specific features 1820 corresponding to the each CNN 1815 may be provided to the respective instance of the RNN 1825 to generate a respective RNN output. The data may be provided to the RNNs 1825 in a sequential manner. In some embodiments, the obtained one or more types of other data corresponding to the damaged vehicle and the respective one or more CNN-specific features 1820 corresponding to the each CNN 1815 may be provided to the respective instance of the RNN 1825 to thereby generate the respective RNN output 1830.

The respective RNN output 1830 may be indicative of whether the damaged vehicle corresponds to the total loss or the damaged vehicle corresponds to being repaired. The RNN 1825 may operate on, by the each instance of the RNN, the respective set of CNN-specific features 1820, thereby generating a respective RNN output 1830 indicative of whether the damaged vehicle corresponds to a total loss or the damaged vehicle corresponds to being repaired. The TLR decision determination may be completed by a decision module 1835 based on a combination of the respective RNN outputs of the plurality of instances of the RNN corresponding to the plurality of different CNNs.

In some embodiments, determining the TLR decision 1835 based on the combination of the respective RNN 1825 outputs may include determining the TLR decision based on a majority indicated by the combination of the respective RNN 1825 outputs. In other embodiments, an average may be used and in yet other embodiments, the averages may be weighted based on past performance of the RNNs 1825. As mentioned, all the total or repair data from the RNNs 1830 may be communicated to a decision module 1835. The decision module 1835 may then examine the data from the various RNNs 1830 and make a final total loss or repair decision 1840.

It should be noted in some embodiments, the RNNs are not included and the CNN uses the features 1820 and historical vehicle total loss and repair data to determine a TLR decision. For example, if an exploded air bag is a feature and historical data indicates an exploded airbag represents a large expense and thus a total decision, the feature of an exploded airbag may be used to make the TLR decision 1830. As mentioned previously, the historical database of features and TLR decisions may be populated with data from a variety of sources. Further, the present TLR decision 1830 and related features may be added to the system to further enlarge the database of features 1820 and TLR decisions 1830.

An image processing system may be created to speed the analysis. The system may have an input interface via which a set of images of a damaged vehicle may be obtained by the image processing system. The user interface may be part of a web site or part of an app. The user interface may have access to a photo album of a user. For example, an app may have access to photos stored on a mobile computing device. Similarly, a user may be able to select from photo files stored on a laptop.

The system may also have a plurality of different CNNs 1815 where each CNN 1815 of the plurality of different CNNs 1815 respectively operating on each image in the set of images of the damaged vehicle to thereby determine a respective one or more CNN-specific features 1820 of the each image 1800. Each CNN 1815 may operate on a specific server designed to maximize the performance of the CNN 1815. In another embodiment, a single server may be designed to operate more than one CNN 1815. For example, the server may have additional memory to allow the large amounts of data to be stored in high speed memory to allow faster analysis.

Similarly, each RNN 1825 may operate on a specific server designed to maximize the performance of the RNN 1825. In another embodiment, a single server may be designed to operate more than one RNN 1825. For example, the server may have additional memory to allow the large amounts of data to be stored in high speed memory to allow faster analysis.

As mentioned, the system may also have an image selection module 1805. The image selection module 1805 may operate on a plurality of images 1800 of the damaged vehicle to select the set of images 1810 of the damaged vehicle to be analyzed. The selection may be based on at least one of a quality of the each image, a content of the each image, or a total number of images that are to be selected.

The system 1801 may also have a determination module that operates on the CNN-specific features 1820 extracted from the set of images 1810 via the plurality of CNNs to generate a TLR decision indicative of one of: (i) the damaged vehicle is a total loss, or (ii) the damaged vehicle is to be repaired. The determination module may use historical data to determine features that were found to be useful by RNNs 1825 and TLR decisions 1830 in the past. For example, whether an airbag was deployed may be an important feature in an image.

Also as mentioned, the system 1801 may also have a Total-Loss-or-Repair (TLR) determination module 1835. At a high level, even while it may be possible to repair a vehicle, it may not make economic sense to do so. For example, a new vehicle may cost $50,000 but it may cost even more to fix a vehicle to be as good as new. In addition, some parts of the damaged vehicle may be able to be sold for parts.

The TLR determination module 1835 may operate on the respective indications generated by the plurality of instances of the RNNs 1825 in combination, to thereby determine one of: (i) the damaged vehicle is the total loss, or (ii) the damaged vehicle is to be repaired, the determination being a TLR decision. The module 1835 may be physically configured to evaluate the indications in a variety of ways. In one embodiment, the module 1835 may take an average of the indications. In another embodiment, the module 1835 may take a weighted average of the indications. In another embodiment, the extreme indications may be dropped and the indications may be averaged. Of course, other ways of determining the final decision are possible and are contemplate.

The system 1801 may also have an output interface via which an indication of the TLR decision is provided to at least one of a user interface or a computing application. In some embodiments, the decision may be communicated to an app that is operated by a supervisor such as an adjustor before it is communicated to a customer. In another embodiment, the decision may be communicated directly to a customer.

Figure 19:
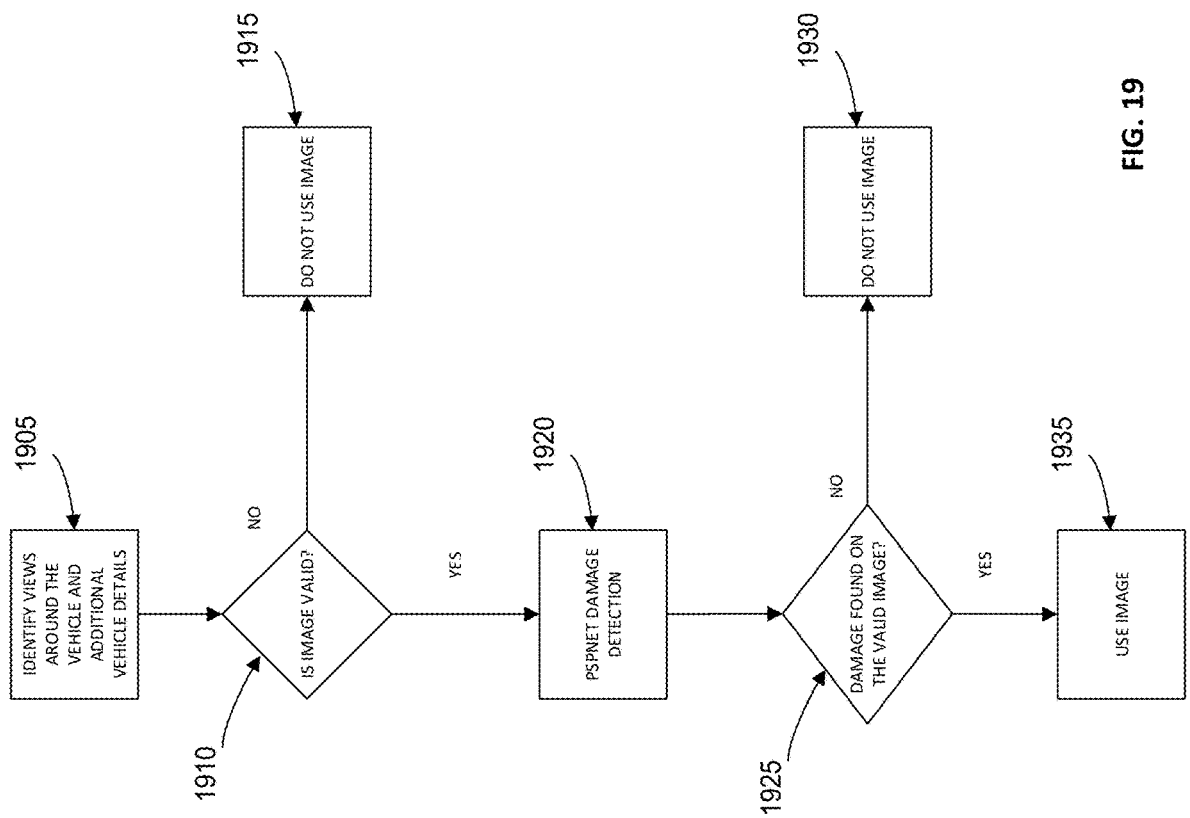
FIG. 19 may illustrate a method of selecting photos and providing feedback.

FIG. 19 may illustrate another aspect of the system and method. At block 1905, the view of submitted images may be reviewed and identified. At block 1910, as mentioned previously, some of the images may be rejected as being duplicative or out of focus or on parts of the vehicle that were not damaged. In addition, the odometer reading, VIN, interior condition may be received and analyzed to determine if the images are useful. If the image is a repeat or otherwise not selected, at block 1915, the image may not be used. In addition, the reason an image may not be used may be communicated such as the image being a duplicate or being out of focus. Having a clear requirement of types of photos and how many photos may be needed may be useful to achieve highest accuracy.

Images that are approved, at block 1920, the PSPNet damage detection may be executed as described previously.

At block 1925, a determination may be made whether damage if found on the valid images from block 1920. If the damage in question is not found, at block 1930 the image may not be used and the reason why may also be communicated. If the damage is found in block 1925, control may pass to block 1935 and the image may be used. The same pipeline of validation for both training and run-time may be needed to minimize overfitting and minimize the problem of unexpected accuracies in production.

Figure 20:
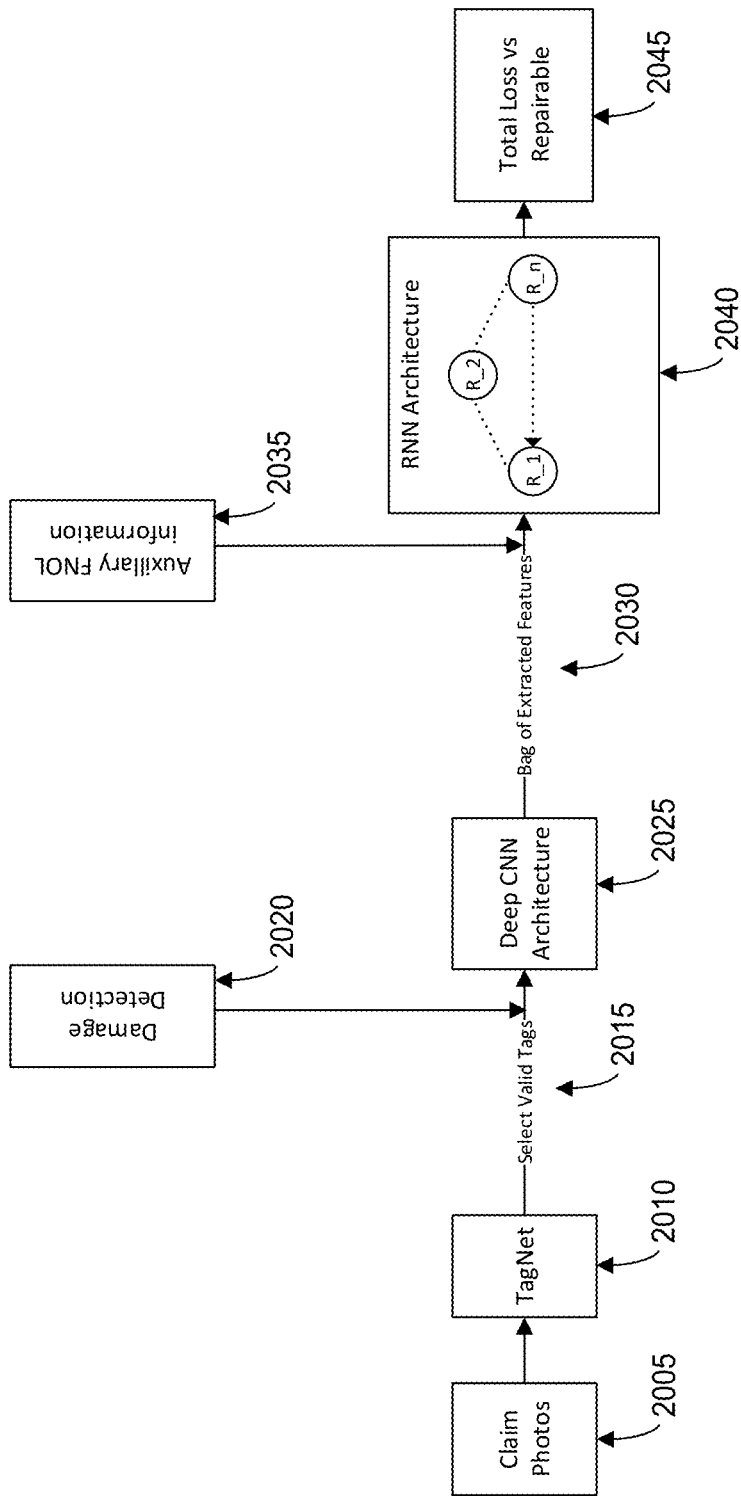
FIG. 20 may illustrate a method of adding additional outside data to the analysis of the total or repair decision.

FIG. 20 may illustrate aspect of the system and method. At block 2005, photos may be analyzed and selected as explained in relation to FIG. 19. At block 2010, the selected photos may be tagged for use using, for example, TagNet. At block 2015, valid tagged photos may be forwarded to the deep CNN architecture along with the data from the damage detection 2020. The deep CNN may create a bag of extracted feature 2030 which may be forwarded to the RNN 2040 along with auxiliary first notice of loss (FNOL) information 2035 such as odometer readings, VIN numbers, etc. The RMM may evaluate the extracted features and the FNOL information to assist in making the total loss of repair decision at block 2045.

The figures depict preferred embodiments for purposes of illustration only. One skilled in the art will readily recognize from the following discussion that alternative embodiments of the structures and methods illustrated herein may be employed without departing from the principles described herein.

Additionally, certain embodiments are described herein as including logic or a number of components, modules, or mechanisms. Modules may constitute either software modules (e.g., code or instructions embodied on a machine-readable medium or in a transmission signal, wherein the code is executed by a processor) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "some embodiments" or "an embodiment" or "teaching" means that a particular element, feature, structure, or characteristic described in connection with the embodiment is included in at least one embodiment. The appearances of the phrase "in some embodiments" or "teachings" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

Further, the figures depict preferred embodiments for purposes of illustration only. One skilled in the art will readily recognize from the following discussion that alternative embodiments of the structures and methods illustrated herein may be employed without departing from the principles described herein Upon reading this disclosure, those of skill in the art will appreciate still additional alternative structural and functional designs for the systems and methods described herein through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the systems and methods disclosed herein without departing from the spirit and scope defined in any appended claims.

The invention claimed is:

1. A method, comprising:
   obtaining a set of images of a damaged vehicle;
   for each Convolutional Neural Network (CNN) of a plurality of different CNNs, each of which has a different architecture:
   1) training the each CNN using historical vehicle total loss and repair data, the historical vehicle total loss and repair data including historical images;
   2) determining a respective set of CNN-specific features from the training, the respective set of CNN-specific features of the each CNN including the respective one or more CNN-specific features based on the different architecture of the each CNN; and
   3) extracting, via the each CNN, a respective one or more CNN-specific features of the respective set of CNN-specific features from each image included in the set of images of the damaged vehicle;
   providing the respective one or more CNN-specific features corresponding to the each CNN to a respective instance of a Recurrent Neural Network (RNN) to thereby generate a respective RNN output, the RNN trained using the historical vehicle total loss and repair data;
   combining the respective RNN outputs of the plurality of instances of the RNN corresponding to the plurality of different CNNs;
   generating, based on the CNN-specific features extracted from the set of images using the plurality of different CNNs and the combined respective RNN outputs of the plurality of instances of the RNN corresponding to the plurality of different CNNs, a Total Loss or Repair (TLR) decision indicative of one of: (i) the damaged vehicle is a total loss, or (ii) the damaged vehicle is to be repaired; and
   providing an indication of the TLR decision to at least one of a user interface or an application.

2. The method of claim 1, further comprising selecting the each CNN of the plurality of different CNNs for inclusion in the plurality of different CNNs based on respective accuracies of TLR decisions generated based on different combinations of different types of CNNs, the each CNN included in the different types of CNNs.

3. The method of claim 1, further comprising selecting the set of images from a plurality of images of the damaged vehicle based on at least one of: image quality, image content, or a total number of images that are to be selected.

4. The method of claim 1, wherein determining the TLR decision based on the combination of the respective RNN outputs includes determining the TLR decision based on a majority indicated by the combination of the respective RNN outputs.

5. The method of claim 4, wherein:
   the historical vehicle total loss and repair data further includes one or more other types of data including at least one of telematics data, drivability status data, point of impact data, accident report data, or video data;
   the method further comprises obtaining the one or more types of other data corresponding to the damaged vehicle; and
   providing the respective one or more CNN-specific features corresponding to the each CNN to the respective instance of the RNN to thereby generate the respective RNN output comprises providing the obtained one or more types of other data corresponding to the damaged vehicle and the respective one or more CNN-specific features corresponding to the each CNN to the respective instance of the RNN to thereby generate the respective RNN output.

6. The method of claim 1, wherein obtaining the set of images of the damaged vehicle comprises obtaining a set of images of a vehicle that is damaged from multiple points of impact.

7. The method of claim 1, wherein obtaining the set of images of the damaged vehicle comprises obtaining multiple images of the damaged vehicle.

8. An image processing system, comprising:
   an input interface via which a set of images of a damaged vehicle is obtained by the image processing system;
   a processor physically configured to:
   train each Convolutional Neural Network (CNN) of a plurality of different CNNs using historical vehicle total loss and repair data, the historical vehicle total loss and repair data including historical images;
   determine a respective set of CNN-specific features from the training, the respective set of CNN-specific features of the each CNN including the respective one or more CNN-specific features based on the different architecture of the each CNN;
   extract, via the each CNN, a respective one or more CNN-specific features of the respective set of CNN-specific features from each image included in the set of images of the damaged vehicle;
   provide the respective one or more CNN-specific features corresponding to the each CNN to a respective instance of a Recurrent Neural Network (RNN) to thereby generate a respective RNN output, the RNN trained using the historical vehicle total loss and repair data;
   combine the respective RNN outputs of the plurality of instances of the RNN corresponding to the plurality of different CNNs;
   generate, based on the CNN-specific features extracted from the set of images using the plurality of different CNNs and the combined respective RNN outputs of the plurality of instances of the RNN corresponding to the plurality of different CNNs, a Total Loss or Repair (TLR) decision indicative of one of: (i) the damaged vehicle is a total loss, or (ii) the damaged vehicle is to be repaired; and
   an output interface via which an indication of the TLR decision is provided to at least one of a user interface or an application.

9. The image processing system of claim 8, further comprising an image selection module including a second processor physically configured to operate on a plurality of images of the damaged vehicle to select the set of images of the damaged vehicle, the selection based on at least one of: an image quality, an image content, or a total number of images that are to be selected.

10. The image processing system of claim 9, wherein the selected set of images includes only a single image.

11. The image processing system of claim 8, wherein each CNN of the plurality of CNNs is selected for inclusion in the image processing system based on respective accuracies of TLR decisions generated based on different combinations of different types of CNNs, the each CNN included in the different types of CNNs.

12. The image processing system of claim 8, wherein the first processor is further physically configured to generate the TLR decision based on a majority indicated by the combination of the respective RNN outputs of the plurality of instances of the RNN corresponding to the plurality of CNNs.

13. The image processing system of claim 8, wherein:
the historical vehicle total loss and repair data includes historical data of one or more other types of data; and
the respective instance of the RNN coupled to the each CNN operates on the respective one or more CNN-specific features extracted by the each CNN from the each image in conjunction with the one or more other types of data corresponding to the damaged vehicle to thereby generate the respective RNN output.

14. The image processing system of claim 8, wherein the damaged vehicle includes multiple points of impact.

15. An image processing system, comprising:
one or more processors; and
one or more tangible, non-transitory computer-readable media storing computer-executable instructions that, when executed by the one or more processors, cause the image processing system to:
obtain a set of images of a damaged vehicle;
via each Convolutional Neural Network (CNN) of a plurality of CNNs each of which has a different architecture:
1) train the each CNN using historical vehicle total loss and repair data, the historical vehicle total loss and repair data including historical images;
2) determine a respective set of CNN-specific features from the training, the respective set of CNN-specific features of the each CNN including the respective one or more CNN-specific features based on the different architecture of the each CNN; and
3) extract a respective one or more CNN-specific features of the respective set of CNN-specific features from each image included in the set of images of the damaged vehicle;
provide the respective one or more CNN-specific features corresponding to the each CNN to a respective instance of a Recurrent Neural Network (RNN) to thereby generate a respective RNN output, the RNN trained using the historical vehicle total loss and repair data;
combine the respective RNN outputs of the plurality of instances of the RNN corresponding to the plurality of different CNNs;
generate, based on the CNN-specific features extracted from the set of images via the plurality of CNNs and the combined respective RNN outputs of the plurality of instances of the RNN corresponding to the plurality of different CNNs, a Total Loss or Repair (TLR) decision indicative of one of: (i) the damaged vehicle is a total loss, or (ii) the damaged vehicle is to be repaired; and
provide an indication of the TLR decision to at least one of a user interface or an application.

16. The image processing system of claim 15, wherein the computer-executable instructions are executable to cause the image processing system further to:
select each image of the set of images from a plurality of images of the damaged vehicle based on at least one of: a quality of the each image, a content of the each image, or a total number of images that are to be selected.

17. The image processing system of claim 15, wherein each CNN of the plurality of CNNs is selected for inclusion in the image processing system based on respective accuracies of TLR decisions generated based on different combinations of different types of CNNs, the each CNN included in the different types of CNNs.

18. The image processing system of claim 15, wherein the generation of the TLR decision is based on a majority indicated by the combination of the respective RNN outputs of the plurality of instances of the RNN.

19. The image processing system of claim 15, wherein the set of images of the damaged vehicle includes a plurality of images of the damaged vehicle.

20. The image processing system of claim 15, wherein the damaged vehicle includes multiple points of impact.

* * * * *